US012409766B2

(12) United States Patent
Li et al.

(10) Patent No.: US 12,409,766 B2
(45) Date of Patent: Sep. 9, 2025

(54) ROTATABLE CUP HOLDER FOR VEHICLE AND VEHICLE EQUIPPED WITH THE SAME

(71) Applicants: Hyundai Motor Company, Seoul (KR); Kia Corporation, Seoul (KR); SEOYON E-HWA CO., LTD., Anyang-si (KR)

(72) Inventors: Cheng Kun Li, Yantai (CN); Chun Lei Sang, Yantai (CN); Won Young Bae, Seoul (KR); Bong Ju Choi, Anyang-Si (KR); Jae Min Kim, Anyang-Si (KR)

(73) Assignees: Hyundai Motor Company, Seoul (KR); Kia Corporation, Seoul (KR); SEOYON E-HWA CO., LTD., Anyang-si (KR)

( * ) Notice: Subject to any disclaimer, the term of this patent is extended or adjusted under 35 U.S.C. 154(b) by 185 days.

(21) Appl. No.: 18/085,296

(22) Filed: Dec. 20, 2022

(65) Prior Publication Data
US 2023/0249600 A1 Aug. 10, 2023

(30) Foreign Application Priority Data
Feb. 10, 2022 (CN) .......................... 202210126143.1

(51) Int. Cl.
*B60N 3/10* (2006.01)
(52) U.S. Cl.
CPC ...................................... *B60N 3/10* (2013.01)
(58) Field of Classification Search
CPC ........................................................ B60N 3/10

USPC ......................................................... 224/539
See application file for complete search history.

(56) References Cited

U.S. PATENT DOCUMENTS

| | | | |
|---|---|---|---|
| 8,579,149 B2* | 11/2013 | Henke ...................... | B60N 3/10 220/8 |
| 9,706,865 B2* | 7/2017 | Shen .................. | A47G 23/0216 |
| 10,562,430 B1* | 2/2020 | Veillon .................. | B60N 3/103 |
| 10,596,947 B2* | 3/2020 | Smithson ............... | B60N 3/105 |
| 2008/0217370 A1* | 9/2008 | Shin ....................... | B60N 3/106 224/539 |
| 2009/0039095 A1* | 2/2009 | Ogura .................... | B60N 3/102 220/737 |

(Continued)

FOREIGN PATENT DOCUMENTS

| | | |
|---|---|---|
| JP | 3231268 U | 3/2021 |
| KR | 10-2017-0028137 A | 3/2017 |
| KR | 10-2112946 B1 | 5/2020 |

*Primary Examiner* — Peter N Helvey
(74) *Attorney, Agent, or Firm* — Morgan Lewis & Bockius LLP

(57) ABSTRACT

A rotatable cup holder for a vehicle and a vehicle provided with the same, includes a cup holder mounting seat configured to be mounted on a vehicle body and including a first accommodation chamber recessed downward, a cup holder main body rotatably mounted in the first accommodation chamber, and a cup holder upper cover fixed to an upper portion of the cup holder main body and including a catching groove provided in an upper surface of the cup holder upper cover to mount an object in the catching groove. The rotatable cup holder is mounted in a vehicle. The rotatable cup holder for a vehicle may hold an object such as a mobile phone and be rotatable to enable the user at various positions to use the rotatable cup holder.

14 Claims, 21 Drawing Sheets

(56) References Cited

U.S. PATENT DOCUMENTS

| | | | |
|---|---|---|---|
| 2013/0075562 A1* | 3/2013 | Miklas | B60N 3/102 |
| | | | 248/286.1 |
| 2016/0000248 A1* | 1/2016 | Shen | B60N 3/102 |
| | | | 220/737 |
| 2018/0208094 A1* | 7/2018 | Medina Luna | B60N 3/10 |
| 2020/0070707 A1* | 3/2020 | Shin | B60N 3/10 |
| 2021/0291715 A1* | 9/2021 | Jiang | B60N 3/10 |

* cited by examiner

ROTATABLE CUP HOLDER FOR VEHICLE AND VEHICLE EQUIPPED WITH THE SAME

CROSS-REFERENCE TO RELATED APPLICATION

The present application claims priority to Chinese Patent Application No. 202210126143.1 filed in the Chinese National Intellectual Property Administration on Feb. 10, 2022, the entire contents of which are incorporated herein by reference.

BACKGROUND OF THE PRESENT DISCLOSURE

Field of the Present Disclosure

The present disclosure relates to a vehicle field, and more particularly, to a rotatable cup holder for a vehicle and a vehicle provided with the same.

Description of Related Art

To meet the needs of people holding articles in vehicles, devices, which may be conveniently used, may be provided in the vicinity of passenger seats. For example, as illustrated in FIG. 1, a cup holder capable of holding a beverage container is provided in a vehicle.

However, all the cup holders in the related art are configured to hold only water cup, and functions of the cup holders are comparatively unified.

Accordingly, it is necessary to further improve the cup holder in the related art.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a rotatable cup holder for a vehicle that has a rotatable cup holder mounting seat and a cup holder upper cover provided on the rotatable cup holder so that an object such as a mobile phone may be placed on the rotatable cup holder, and which is rotatable to allow a user at various positions to use the rotatable cup holder, and a vehicle provided with the same.

Various aspects of the present disclosure are directed to providing a rotatable cup holder for a vehicle, the rotatable cup holder including: a cup holder mounting seat configured to be mounted on a vehicle body and including a first accommodation chamber recessed downward; a cup holder main body rotatably mounted in the first accommodation chamber; and a cup holder upper cover fixed to an upper portion of the cup holder main body and including a catching groove provided in an upper surface of the cup holder upper cover to mount an object in the catching groove.

A first extension portion extending upward may be provided on the upper surface of the cup holder upper cover, and the catching groove may be provided in the first extension portion.

A second extension portion extending downward may be provided on the cup holder upper cover, an insertion connection portion extending downward may be provided on the second extension portion, a first connection portion may be provided on the upper portion of the cup holder main body, and the insertion connection portion may be coupled to the first connection portion.

The cup holder upper cover may further include a third extension portion extending downward and positioned at an external periphery of the second extension portion, a position limiting portion and a fourth extension portion may be provided between the second extension portion and the third extension portion, the position limiting portion may have a plurality of teeth, an annular accommodation portion may be provided on an upper portion of the first accommodation chamber, an arcuate position limiting rubber pad and a first position limiting elastic member may be mounted in the accommodation portion, a protrusion may be provided on an upper portion of the first position limiting elastic member, the fourth extension portion of the cup holder upper cover may push the position limiting rubber pad, and the protrusion of the first position limiting elastic member may be fitted with the plurality of teeth of the position limiting portion of the cup holder upper cover so that a position of the cup holder upper cover is limited.

A first damping member may be provided between a sidewall of the cup holder main body and a sidewall of the first accommodation chamber, and a second damping member may be provided between a bottom plate of the cup holder main body and a bottom plate of the first accommodation chamber.

An annular fifth extension portion extending downward and an annular sixth extension portion positioned at an external periphery of the fifth extension portion may be provided on a lower surface of the bottom plate of the cup holder main body, a blind hole may be formed at a center portion of the fifth extension portion, an accommodation groove may be formed in a space between the fifth extension portion and the sixth extension portion, the rotatable cup holder may further include a rotary bracket and a screw, and the rotary bracket may be mounted at a lower side of the accommodation groove by the screw.

A second accommodation chamber recessed downward may be provided in a bottom plate of the first accommodation chamber, the second accommodation chamber may accommodate the fifth extension portion and the sixth extension portion, a first through-hole may be provided in a bottom portion of the second accommodation chamber, the rotary bracket may include an annular insertion portion and an annular position limiting portion integrally formed with each other, a diameter of the annular insertion portion may be smaller than a diameter of the annular position limiting portion, a second through-hole may be provided in the annular insertion portion to accommodate a bottom portion of the fifth extension portion, a third through-hole may be provided in the annular position limiting portion and correspond to the second through-hole, the annular insertion portion may penetrate the first through-hole and then be inserted into the accommodation groove, and the screw may penetrate the third through-hole from below to above and then be threaded to inside of the fifth extension portion to restrict the annular position limiting portion toward a lower side of the second accommodation chamber.

The rotatable cup holder for a vehicle may further include a second position limiting elastic member, in which the second position limiting elastic member is mounted in the accommodation groove and surrounds the fifth extension portion, upper and lower end portions of the second position limiting elastic member respectively come into contact with a lower surface of the bottom plate of the cup holder main body and an upper surface of the annular position limiting portion of the rotary bracket to provide tension, and the tension brings cross-sections of the rotary bracket and the screw into contact with each other.

A seventh extension portion extending downward may be further provided on the lower surface of the bottom plate of the cup holder main body, an arcuate position limiting groove may be provided in the bottom plate of the first accommodation chamber, and the seventh extension portion may be inserted into the arcuate position limiting groove and slidable along the arcuate position limiting groove.

A protruding portion or a concave groove may further be provided on the first extension portion.

Various aspects of the present disclosure are directed to providing a vehicle provided with the rotatable cup holder for a vehicle according to the first aspect.

According to an exemplary embodiment of the present disclosure, the rotatable cup holder for a vehicle may hold an object such as a mobile phone and be rotatable to enable a user at various positions to use the rotatable cup holder.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
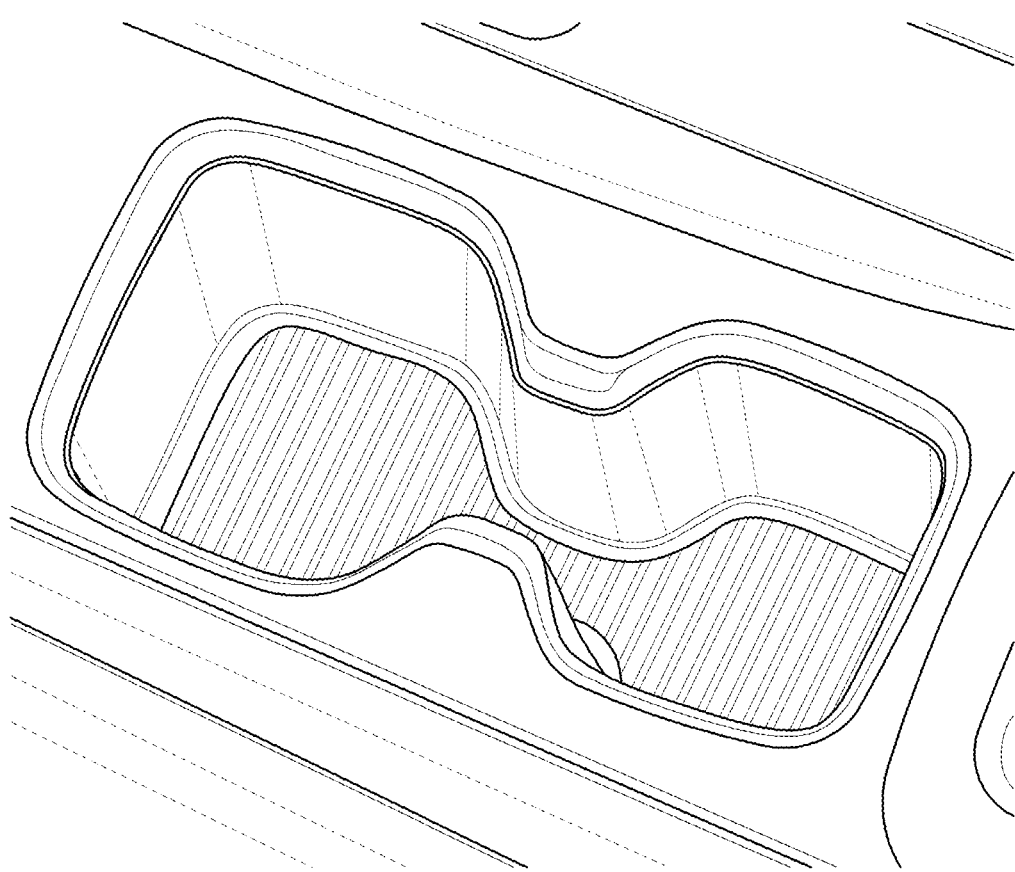
FIG. 1 is a schematic view exemplarily illustrating a structure of a cup holder in the related art.
Figure 2:
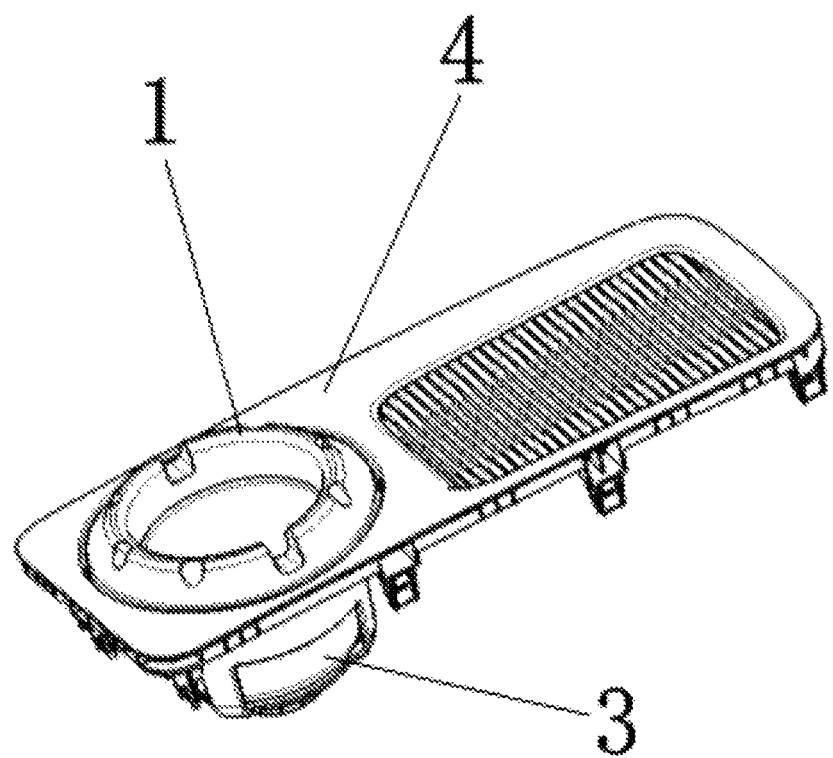
FIG. 2 is a schematic view exemplarily illustrating a structure of a rotatable cup holder for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, respective embodiments of the present disclosure will be described below in detail with reference to the drawings illustrating the embodiments. While the present disclosure will be described with reference to the exemplary embodiment of the present disclosure, it should be understood that the present specification is not intended to limit the present disclosure to the exemplary embodiment of the present disclosure. On the other hand, the present disclosure includes not only the exemplary embodiment of the present disclosure, but also various types of selection forms, modification forms, equivalence forms, and other embodiments within the spirit of the present disclosure and the scope defined by the appended claims.

Hereinafter, a rotatable cup holder for a vehicle according to various exemplary embodiments of the present disclosure will be described with reference to FIGS. 2 to 21.

As illustrated in FIGS. 2 to 10, a rotatable cup holder for a vehicle according to various exemplary embodiments of the present disclosure includes a cup holder mounting seat 4, a cup holder main body 3, and a cup holder upper cover 1. The cup holder mounting seat 4 is mounted on a vehicle body. The cup holder mounting seat 4 has a first accommodation chamber 41 recessed downward. The cup holder main body 3 is rotatably mounted in the first accommodation chamber 41. The cup holder upper cover 1 may be fixed to an upper portion of the cup holder main body 3. A catching groove 17 may be provided in an upper surface of the cup holder upper cover 1 and hold an object.

Figure 17:
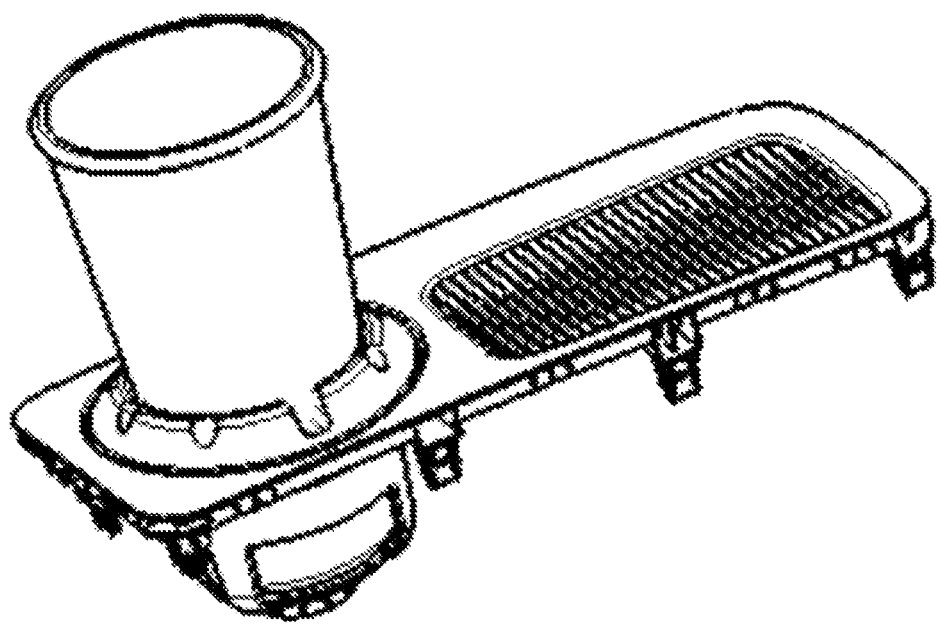
FIG. 17 is a schematic view exemplarily illustrating that a water cup is placed on a rotatable cup holder according to various exemplary embodiments of the present disclosure.

An object such as a water cup may be held in the cup holder main body 3 (see FIG. 17). An object such as a mobile phone or a tablet may be held by the catching groove 17 of the cup holder upper cover 1. The cup holder upper cover 1 can rotate horizontally so that a user at various positions may use an object such as a mobile phone or a tablet (see FIGS. 18 and 19).

Figure 9:
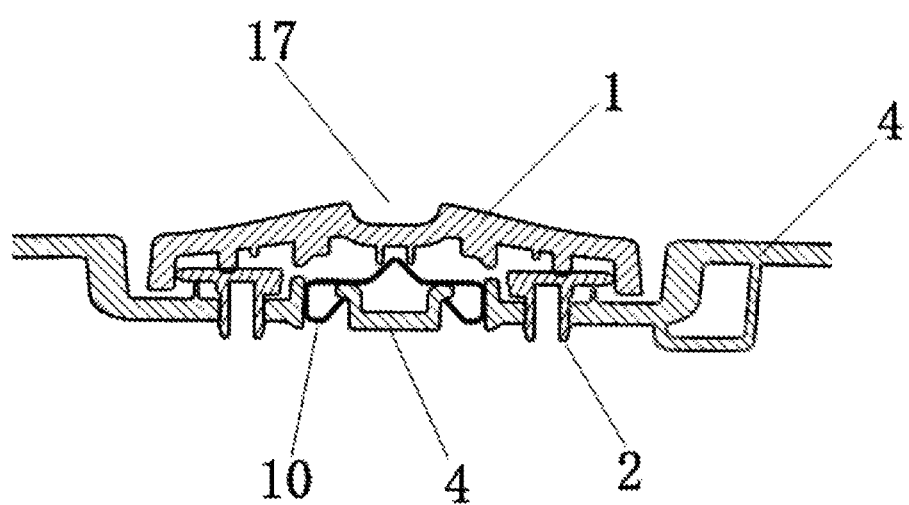
FIG. 9 is a cross-sectional view taken along a line A-A in FIG. 8.
Figure 10:
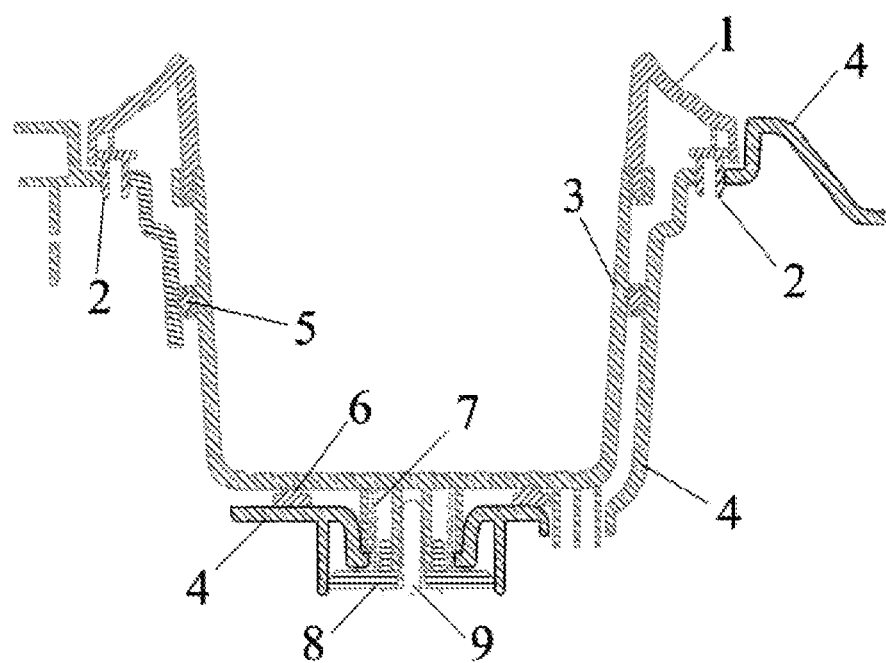
FIG. 10 is a cross-sectional view taken along a line B-B in FIG. 8.
Figure 11:
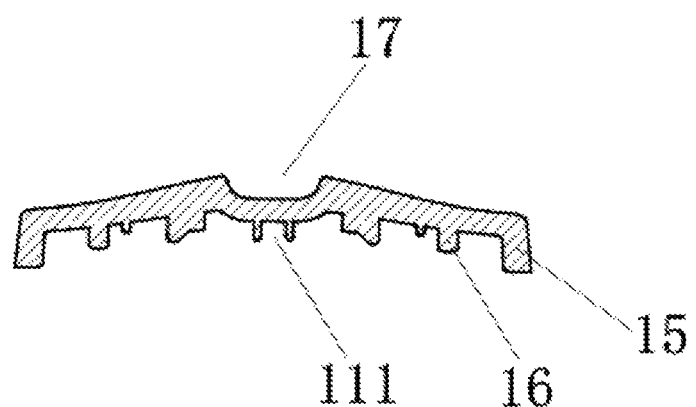
FIG. 11 is a schematic view exemplarily illustrating a structure of the cup holder upper cover in FIG. 9.
Figure 12:
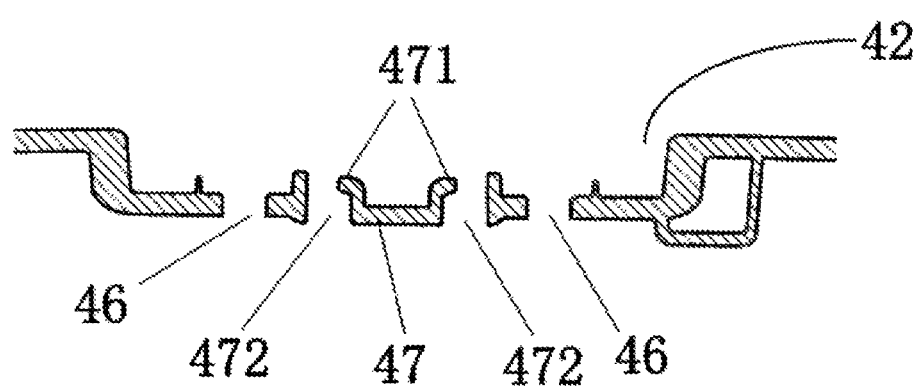
FIG. 12 is a schematic view exemplarily illustrating a structure of a cup holder mounting seat in FIG. 9.

In the exemplary embodiment of the present disclosure, as illustrated in FIG. 9 and FIG. 10, a position limiting rubber pad 2 and a first position limiting elastic member 10 are provided between the cup holder upper cover 1 and the cup holder mounting seat 4.

In the exemplary embodiment of the present disclosure, the cup holder upper cover 1 has an annular and hollow shape as a whole. When the cup holder upper cover 1 is mounted on the cup holder main body 3, the cup holder upper cover 1 does not affect a situation in which the user places an object such as a cup on the cup holder main body 3.

Figure 3:
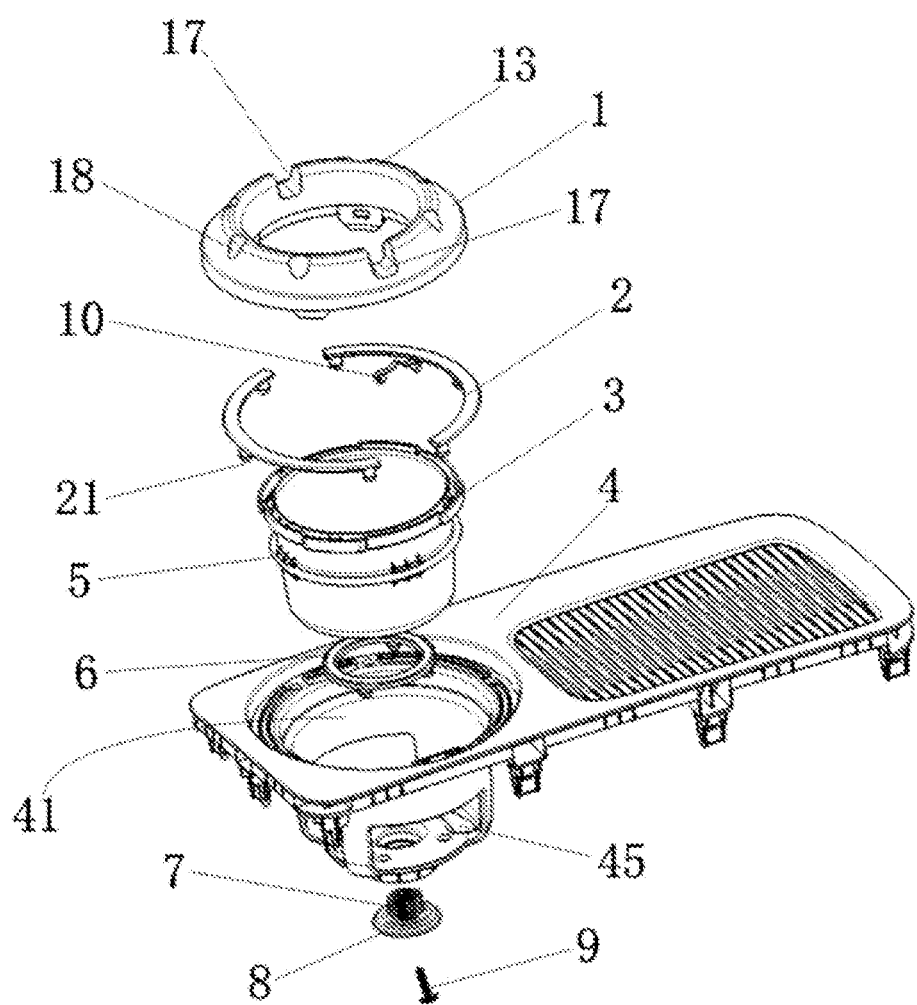
FIG. 3 is a perspective exploded view of FIG. 2.
Figure 4:
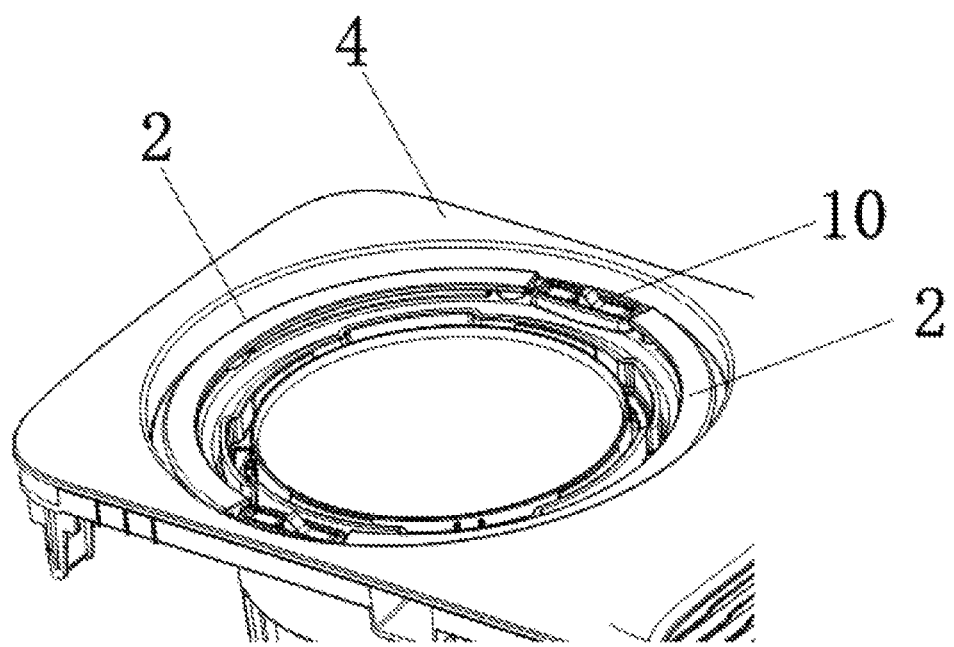
FIG. 4 is a schematic view exemplarily illustrating a position limiting rubber pad in FIG. 2 and a mounting position of a first position limiting elastic member.
Figure 13:
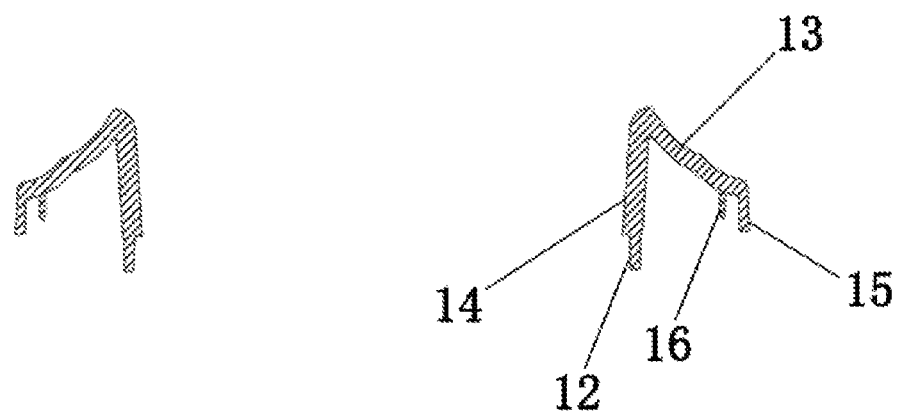
FIG. 13 is a schematic view exemplarily illustrating a structure of a cup holder upper cover in FIG. 10.

In the exemplary embodiment of the present disclosure, a first extension portion 13 extending upward is provided on the upper surface of the cup holder upper cover 1 (see FIGS. 3 and 13). Two catching grooves 17 are provided in the first extension portion 13. The two catching grooves 17 are disposed at an interval of 180 degrees in a circumferential direction of the first extension portion 13 (see FIG. 3).

A diameter of the first extension portion 13 gradually decreases from an upper portion to a lower portion thereof (see FIGS. 3 and 13).

In the exemplary embodiment of the present disclosure, the catching groove 17 is approximately perpendicular to a horizontal plane (see FIG. 3). An upper opening of the catching groove 17 is slightly greater than a lower portion of the catching groove 17. When an object such as a mobile phone is placed on the catching groove 17, the object such as a mobile phone is approximately perpendicular to the horizontal plane (see FIGS. 18 and 19).

Figure 20:
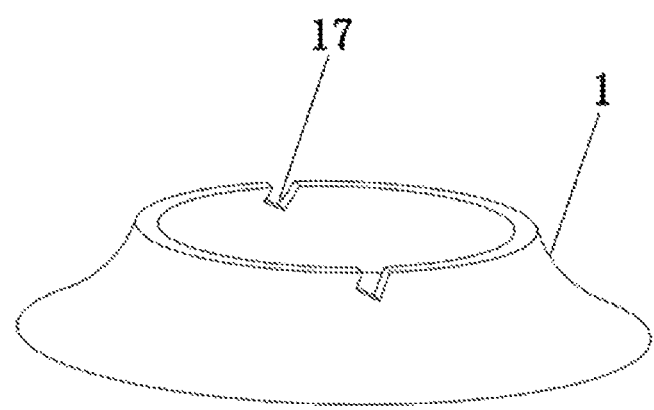
FIG. 20 is a schematic view exemplarily illustrating a structure of a cup holder upper cover according to various exemplary embodiments of the present disclosure.

In the exemplary embodiment of the present disclosure, the catching groove 17 is provided to be inclined at a predetermined angle with respect to the horizontal plane (see FIG. 20). When the object such as a mobile phone is placed in the catching grooves 17, the object may be inclined at the predetermined angle so that the user conveniently sees the object.

In the exemplary embodiment of the present disclosure, a plurality of concave grooves 18 is additionally provided in the first extension portion 13 (see FIG. 3). The plurality of concave grooves 18 is uniformly distributed in the circumferential direction on the first extension portion 13. The plurality of concave grooves 18 increases a frictional force between the first extension portion 13 and the user's hand at the time of rotating the cup holder to allow the user to conveniently rotate the cup holder.

In addition to the concave groove 18, a protruding portion may be provided to allow the user to conveniently rotate the cup holder by increasing the frictional force between the user's hand and the first extension portion 13 at the time of rotating the cup holder.

In the exemplary embodiment of the present disclosure, the cup holder upper cover 1 has a second extension portion 14 extending downward (see FIG. 13). The second extension portion 14 has an insertion connection portion 12 extending downward.

In the exemplary embodiment of the present disclosure, as illustrated in FIG. 13, the cup holder upper cover 1 has a third extension portion 15 positioned at an external periphery of the second extension portion 14 and extending downward. A position limiting portion 11 (see FIG. 5, FIG. 6 and FIG. 7) and a fourth extension portion 16 (see FIGS. 11 and 13) are provided between the second extension portion 14 and the third extension portion 15. The position limiting portion 11 has a plurality of teeth 111 (see FIG. 5, FIG. 6 and FIG. 7).

The third extension portion 15 may be coupled to the position limiting rubber pad 2 and implement a dust-proof function.

The fourth extension portion 16 has an annular shape and is positioned at the external periphery of the position limiting portion 11. The fourth extension portion 16 pushes the position limiting rubber pad 2, and a downward movement of the fourth extension portion 16 is restricted by the position limiting rubber pad 2.

The plurality of teeth 111 of the position limiting portion 11 may be fitted with protrusions 101 of the first position limiting elastic member 10 which will be described below.

In the exemplary embodiment of the present disclosure, the position limiting rubber pad 2 has an arcuate shape. Two position limiting rubber pads 2 are provided.

An upper surface of the position limiting rubber pad 2 is flat so that the fourth extension portion 16 of the cup holder upper cover 1 can rotate along the upper surface of the position limiting rubber pad 2. Meanwhile, the position limiting rubber pad 2 may restrict the downward movement of the fourth extension portion 16. On the other hand, the position limiting rubber pad 2 may increase damping properties during a process of rotating the cup holder upper cover 1.

A plurality of insertion portions 21 is provided on a lower surface of the position limiting rubber pad 2 (see FIG. 3).

Figure 6:
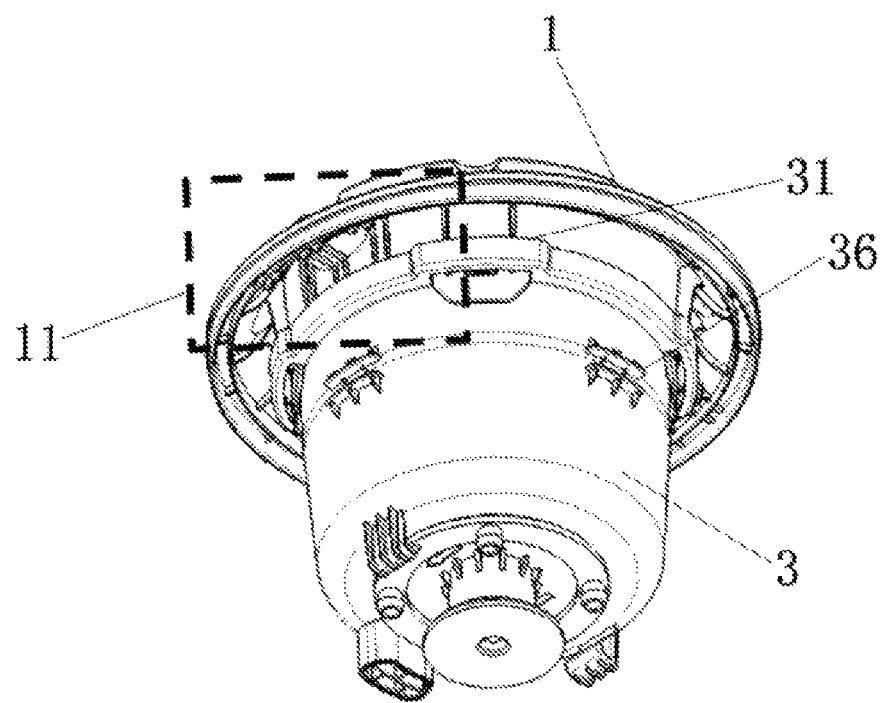
FIG. 6 is a schematic view exemplarily illustrating that the cup holder upper cover and a cup holder main body are assembled.
Figure 7:
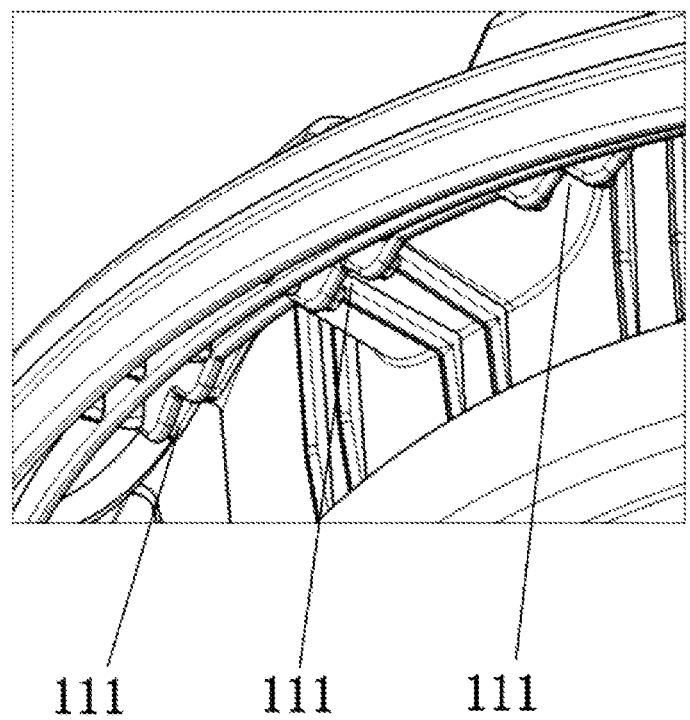
FIG. 7 is an enlarged schematic view of a position limiting portion in FIG. 6.
Figure 8:
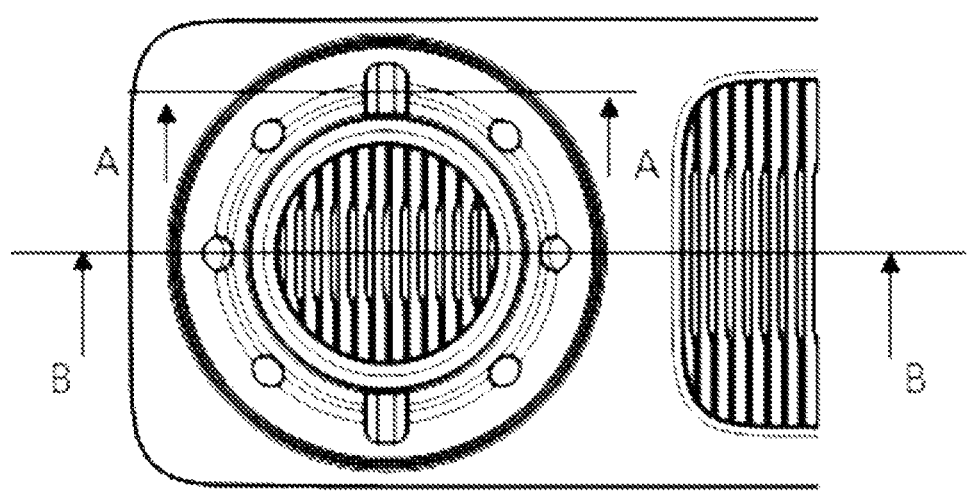
FIG. 8 is a partial schematic view of a top plan view of FIG. 2.
Figure 14:
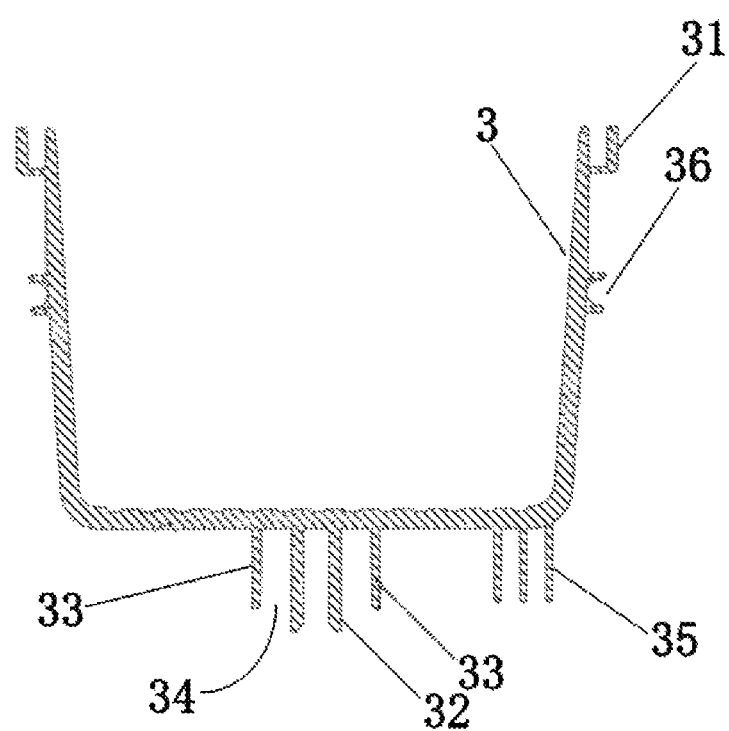
FIG. 14 is a schematic view exemplarily illustrating a structure of a cup holder main body in FIG. 10.

In the exemplary embodiment of the present disclosure, a first connection portion 31 is provided on an upper portion of the cup holder main body 3 so that the insertion connection portion 12 of the second extension portion 14 of the cup holder upper cover 1 is coupled to the first connection portion 31 (see FIGS. 6 and 14).

The insertion connection portion 12 of the second extension portion 14 of the cup holder upper cover 1 is inserted into a concave groove of the first connection portion 31 to fix the cup holder upper cover 1 to the cup holder main body 3 so that the cup holder upper cover 1 and the cup holder main body 3 are rotated in a synchronized manner.

In the exemplary embodiment of the present disclosure, as illustrated in FIG. 14, an annular fifth extension portion 32 extending downward is provided on a lower surface of a bottom plate of the cup holder main body 3. An annular sixth extension portion 33 positioned at an external periphery of the fifth extension portion 32 is provided on the lower surface of the bottom plate of the cup holder main body 3. A blind hole is formed at a center portion of the fifth extension portion 32. An internal thread is provided in the blind hole. An accommodation groove 34 is formed in a space between the fifth extension portion 32 and the sixth extension portion 33.

In the exemplary embodiment of the present disclosure, as illustrated in FIG. 14, a seventh extension portion 35 extending downward are additionally provided on the lower surface of the bottom plate of the cup holder main body 3.

In the exemplary embodiment of the present disclosure, as illustrated in FIG. 10, a first damping member 5 is provided between a sidewall of the cup holder main body 3 and a sidewall of the first accommodation chamber 41 to increase the damping properties during the process of rotating the cup holder main body 3. A rubber pad may be used as the first damping member 5.

In the exemplary embodiment of the present disclosure, as illustrated in FIGS. 6 and 14, a bracket 36 for mounting the first damping member 5 is provided on the sidewall of the cup holder main body 3.

A cross-section of a contact surface of the bracket 36 and the first damping member 5 is formed in an arcuate shape so that an opening thereof is directed outward.

In the exemplary embodiment of the present disclosure, as illustrated in FIG. 10, a second damping member 6 is provided between a bottom plate of the cup holder main body 3 and a bottom plate of the first accommodation chamber 41 to increase the damping properties during the process of rotating the cup holder main body 3.

A rubber pad may be used as the second damping member 6.

Figure 15:
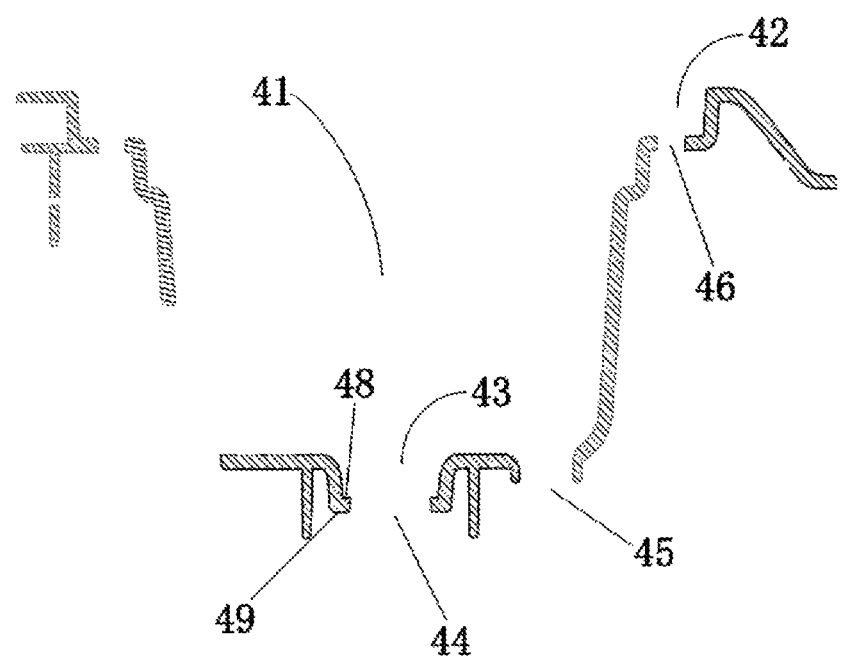
FIG. 15 is a schematic view exemplarily illustrating a structure of a cup holder mounting seat in FIG. 10.

In the exemplary embodiment of the present disclosure, as illustrated in FIG. 15, the cup holder mounting seat 4 has a first accommodation chamber 41 recessed downward, and an annular accommodation portion 42 is provided in an upper portion of the first accommodation chamber 41. Arcuate mounting grooves 46 (see FIGS. 12 and 15) and two mounting frames 47 (see FIG. 12) are provided in the accommodation portion 42. The mounting groove 46 is used to mount the arcuate position limiting rubber pad 2, and the mounting frame 47 is used to mount the first position limiting elastic member 10.

The plurality of insertion portions 21 on the lower surface of the position limiting rubber pad 2 is inserted into the mounting grooves 46.

Catching grooves 472 are provided at two opposite sides of the mounting frame 47, and protruding portions 471 are provided at upper end portions of the two opposite sides of the mounting frame 47. Each of the two protruding portions 471 is bent toward the catching groove 472 adjacent to the protruding portion 471 (see FIG. 12). The protruding portions 471 are used to restrict hook portions 103 of the first position limiting elastic member 10 which will be described below.

In the exemplary embodiment of the present disclosure, as illustrated in FIG. 15, a second accommodation chamber 43 recessed downward is provided on a bottom plate of the first accommodation chamber 41 of the cup holder mounting seat 4, and the second accommodation chamber 43 may accommodate the fifth extension portion 32 and the sixth extension portion 33 of the cup holder main body 3. A first through-hole 44 is provided in a bottom portion of the second accommodation chamber 43, and an annular insertion portion 81 of the rotary bracket 8, which will be described below, is provided to penetrate the first through-hole 44.

In the exemplary embodiment of the present disclosure, as illustrated in FIG. 15, a stepped surface 48 is provided on the bottom portion of the second accommodation chamber 43 to restrict the bottom portion of the sixth extension portion 33.

A gap is formed between the stepped surface 48 of the bottom portion of the second accommodation chamber 43 and the bottom portion of the sixth extension portion 33. When the cup holder main body 3 sways upward or downward, the bottom portion of the sixth extension portion 33 may come into contact with the stepped surface 48 of the bottom portion of the second accommodation chamber 43 to restrict the sixth extension portion 33 of the stepped surface 48, preventing an extent in which the cup holder main body 3 sways downwardly from being excessively increased.

Figure 5:
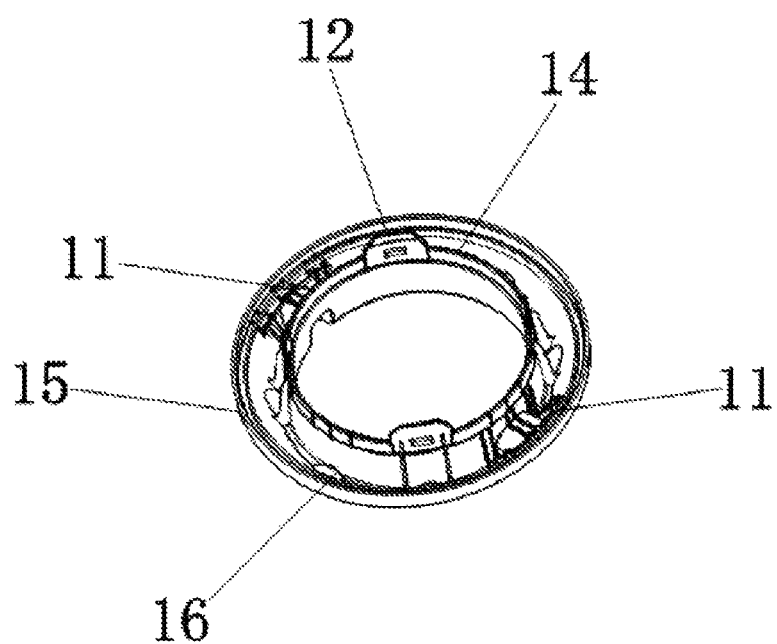
FIG. 5 is a schematic view exemplarily illustrating a structure of a cup holder upper cover.

In the exemplary embodiment of the present disclosure, an arcuate position limiting groove 45 may be additionally provided in the bottom plate of the first accommodation chamber 41 (see FIGS. 5 and 15). The seventh extension portion 35 of the cup holder main body 3 may be inserted into the arcuate position limiting groove 45 and slide along the arcuate position limiting groove 45 to restrict a rotation angle of the cup holder main body 3 (see FIGS. 3, 10, and 15).

In the exemplary embodiment of the present disclosure, two first position limiting elastic members 10 are provided and respectively mounted on the mounting frames 47 corresponding to each other.

Figure 21:
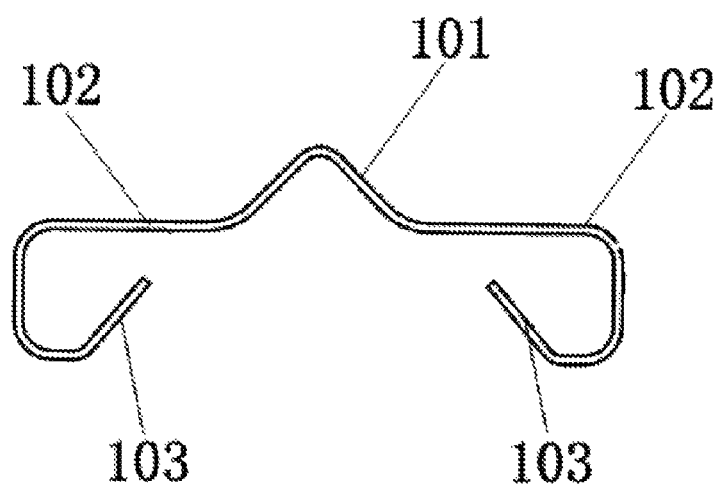
FIG. 21 is a schematic view exemplarily illustrating a structure of a first position limiting elastic member in FIG. 9.

The first position limiting elastic member 10 is made of an elastic material and includes a protrusion 101, a connection portion 102, and the hook portions 103 that are integrally formed with each other (see FIG. 21). The protrusion 101 is provided on an upper portion of the connection portion 102, and the hook portions 103 are provided at lower sides of two opposite end portions of the connection portion 102. The protrusion 101 and the connection portion 102 of the first position limiting elastic member 10 are mounted above the mounting frame 47, and the two hook portions 103 are mounted in the catching grooves 472 at the two opposite sides of the mounting frame 47 and restricted by the protruding portions 471 corresponding to each other, preventing the first position limiting elastic member 10 from separating from the mounting frame 47 (see FIGS. 9, 12, and 21).

During the process of rotating the cup holder upper cover 1, the protrusion 101 of the first position limiting elastic member 10 may be fitted with one of the plurality of teeth 111 of the position limiting portion 11 of the cup holder upper cover 1 to limit the position of the cup holder upper cover 1 to a particular position thereof. The plurality of teeth 111 may be provided, and the position of the cup holder upper cover 1 may be limited to a plurality of positions by the protrusion 101 of the first position limiting elastic member 10.

The position limiting relationship between the arcuate position limiting groove 45 of the cup holder mounting seat 4 and the seventh extension portion 35 of the cup holder main body 3 allows the cup holder main body 3 and the cup holder upper cover 1 to rotate only within a predetermined range of degree of curvature, preventing the position limiting portion 11 of the cup holder upper cover 1 from separating from the protrusion 101 of the first position limiting elastic member 10.

The rotatable cup holder for a vehicle according to the exemplary embodiment of the present disclosure further includes the rotary bracket 8. The rotary bracket 8 is mounted on the bottom portion of the fifth extension portion 32 of the cup holder main body 3 by a screw 9.

Figure 16:
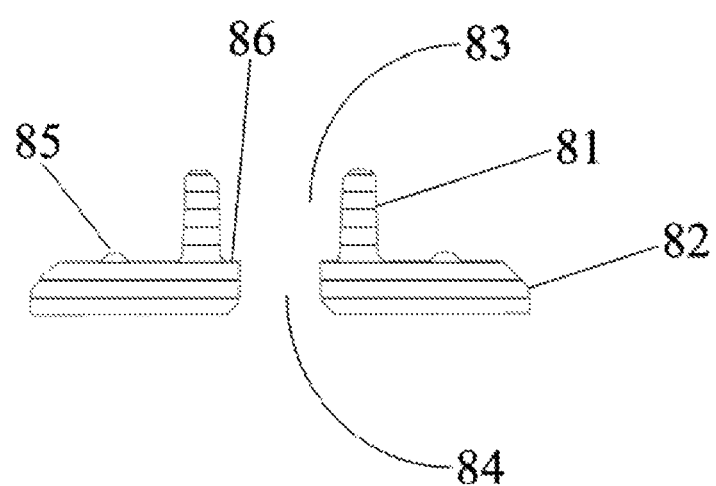
FIG. 16 is a schematic view exemplarily illustrating a structure of a rotary bracket in FIG. 10.

In the exemplary embodiment of the present disclosure, as illustrated in FIG. 16, the rotary bracket 8 includes an annular insertion portion 81 and an annular position limiting portion 82 integrally formed with each other. A diameter of the annular insertion portion 81 is smaller than a diameter of the annular position limiting portion 82. A second through-hole 83 is provided in the annular insertion portion 81. A third through-hole 84 is provided in the annular position limiting portion 82 and corresponds to the second through-hole 83. When the annular insertion portion 81 is inserted into the accommodation groove 34 of the cup holder main body 3, the second through-hole 83 may accommodate the bottom portion of the fifth extension portion 32.

A diameter of the third through-hole 84 may be smaller than that of the second through-hole 83 to form a stepped surface 86. The stepped surface 86 may restrict the fifth extension portion 32.

In the exemplary embodiment of the present disclosure, an annular protruding portion 85 may be provided on an upper surface of the annular position limiting portion 82. In general, a gap is formed between the bottom surface 49 of the second accommodation chamber 43 and the annular protruding portion 85. When the rotary bracket 8 sways upward or downward by the cup holder main body 3, the annular protruding portion 85 may come into contact with the bottom surface 49 of the second accommodation chamber 43, preventing an extent in which the cup holder main body 3 sways upwardly or downwardly from being excessively increased.

The installation of the arcuate protruding portion 85 may reduce a frictional force after the annular position limiting portion 82 comes into contact with the cup holder mounting seat 4 in comparison with the case in which the upper surface of the annular position limiting portion 82 comes into direct contact with the bottom surface of the second accommodation chamber 43.

During an assembling process, the screw 9 is provided to penetrate the third through-hole 84 from below to above and is threaded to the inside of the fifth extension portion 32, restricting the annular position limiting portion 82 toward the lower side of the second accommodation chamber 43.

In general, a screw thread portion of the screw 9 is not tightened to be fully inserted into the fifth extension portion 32. Therefore, a distance between the bottom plate of the cup holder main body 3 and the rotary bracket 8 may be adjusted by adjusting the screw 9. Therefore, a frictional force between the bottom plate of the cup holder main body 3 and the second damping member 6 is adjusted by adjusting pressure between the bottom plate of the cup holder main body 3 and the second damping member 6 (i.e., the damping properties occurring on the cup holder main body 3 of the second damping member 6 are adjusted).

In the exemplary embodiment of the present disclosure, the rotatable cup holder for a vehicle further includes a second position limiting elastic member 7. The second position limiting elastic member 7 is mounted in the accommodation groove 34 and surrounds the fifth extension portion 32. Upper and lower end portions of the second position limiting elastic member 7 respectively come into contact with the lower surface of the bottom plate of the cup holder main body 3 and the upper surface of the annular position limiting portion 82 of the rotary bracket 8 to provide tension. The tension brings the cross-sections of the rotary bracket 8 and the screw 9 into contact with each other to prevent relative releasing between the rotary bracket 8 and the screw 9, maintaining stability of screw force.

A coil spring may be used as the second position limiting elastic member 7.

Another exemplary embodiment of the present disclosure additionally provides a vehicle provided with the rotatable cup holder.

The rotatable cup holder may be a rotatable cup holder provided on an armrest between a driver seat and a passenger seat. The rotatable cup holder may be provided on a rear seat. The rotatable cup holder may hold an object such as a mobile phone or a tablet and be rotated to enable the user at various positions to use the rotatable cup holder.

Hereinafter, an operation of the rotatable cup holder for a vehicle according to an exemplary embodiment of the present disclosure will be described with reference to the drawings.

When the user intends to place a water cup, the user may mount the water cup directly in the cup holder main body 3 (see FIG. 17).

Figure 18:
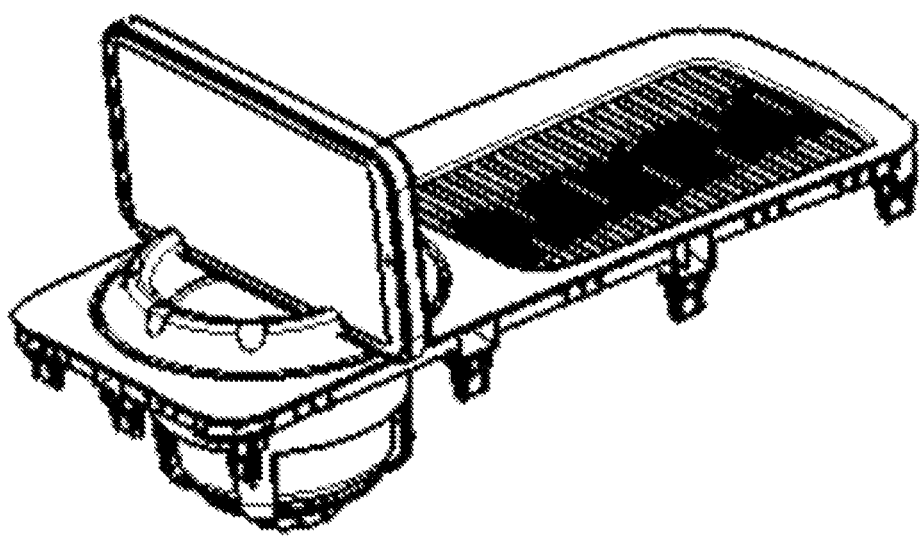
FIG. 18 is one schematic view exemplarily illustrating that a mobile phone is placed on a rotatable cup holder according to various exemplary embodiments of the present disclosure.

When no water cup is not placed, the user may place an object such as a mobile phone or a tablet in the catching grooves 17 on the cup holder upper cover 1 and then see the object (see FIG. 18).

Figure 19:
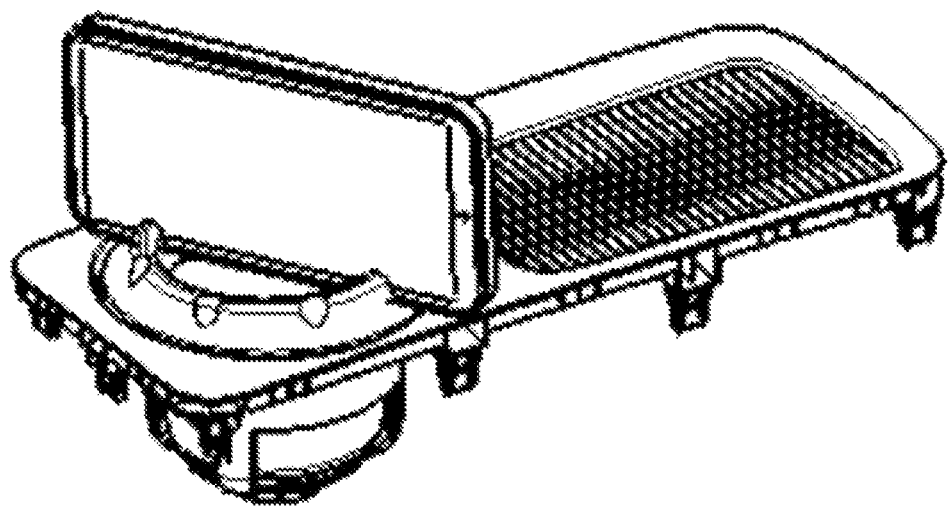
FIG. 19 is another schematic view exemplarily illustrating that a mobile phone is placed on a rotatable cup holder according to various exemplary embodiments of the present disclosure.

The user may also rotate the object such as a mobile phone or a tablet by an appropriate angle by rotating the first extension portion 13 of the cup holder upper cover 1 and conveniently see the object (see FIG. 19).

To better interpret and accurately define the appended claims, and the terms "upper", "lower", "inner", "outer", "upper surface", "lower surface", "upper side", "lower side", "upward", "downward", "front", "rear", "back", "inner side", "external side", "inward", "outward", "inner portion", "external portion", "inner", "outer", "forward", and "rearward" are intended to explain the features of the exemplary embodiment with reference to the positions of the features illustrated in the drawings.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A rotatable cup holder for a vehicle, the rotatable cup holder comprising:
　　a cup holder mounting seat configured to be mounted on a vehicle body and including a first accommodation chamber recessed downward;
　　a cup holder main body rotatably mounted in the first accommodation chamber; and
　　a cup holder upper cover fixed to an upper portion of the cup holder main body and including a catching groove provided in an upper surface of the cup holder upper cover to mount an object in the catching groove,
　　wherein a first extension portion extending upward is provided on the upper surface of the cup holder upper cover, and the catching groove is provided in the first extension portion,
　　wherein a second extension portion extending downward is provided on the cup holder upper cover,
　　wherein an insertion connection portion extending downward is provided on the second extension portion,
　　wherein a first connection portion is provided on the upper portion of the cup holder main body, and the insertion connection portion is coupled to the first connection portion,
　　wherein the cup holder upper cover further includes a third extension portion extending downward and positioned at an external periphery of the second extension portion, a position limiting portion and a fourth extension portion are provided between the second extension portion and the third extension portion, and the position limiting portion has a plurality of teeth, and wherein an annular accommodation portion is provided on an upper portion of the first accommodation chamber, an arcuate position limiting rubber pad and a first position limiting elastic member are mounted in the accommodation portion, and a protrusion is provided on an upper portion of the first position limiting elastic member.

2. The rotatable cup holder of claim 1, wherein the catching groove is perpendicular to a horizontal plane or provided to be inclined at a predetermined angle with respect to the horizontal plane.

3. The rotatable cup holder of claim 1,
wherein the second extension portion of the cup holder upper cover pushes the position limiting rubber pad, and the protrusion of the first position limiting elastic member is fitted with the plurality of teeth of the position limiting portion of the cup holder upper cover so that a position of the cup holder upper cover is limited.

4. The rotatable cup holder of claim 1,
wherein arcuate mounting grooves are provided in the accommodation portion, and
wherein a plurality of insertion portions formed on a lower surface of the position limiting rubber pad is inserted into the mounting grooves.

5. The rotatable cup holder of claim 1, wherein a first damping member is provided between a sidewall of the cup holder main body and a sidewall of the first accommodation chamber.

6. The rotatable cup holder of claim 1, wherein a second damping member is provided between a bottom plate of the cup holder main body and a bottom plate of the first accommodation chamber.

7. A rotatable cup holder for a vehicle, the rotatable cup holder comprising:
a cup holder mounting seat configured to be mounted on a vehicle body and including a first accommodation chamber recessed downward;
a cup holder main body rotatably mounted in the first accommodation chamber; and
a cup holder upper cover fixed to an upper portion of the cup holder main body and including a catching groove provided in an upper surface of the cup holder upper cover to mount an object in the catching groove,
wherein an annular fifth extension portion extending downward and an annular sixth extension portion positioned at an external periphery of the fifth extension portion are provided on a lower surface of a bottom plate of the cup holder main body, a blind hole is formed at a center portion of the fifth extension portion, and an accommodation groove is formed in a space between the fifth extension portion and the sixth extension portion.

8. The rotatable cup holder of claim 7,
wherein the rotatable cup holder further includes a rotary bracket and a screw, and
wherein the rotary bracket is mounted at a lower side of the accommodation groove by the screw.

9. The rotatable cup holder of claim 8,
wherein a second accommodation chamber recessed downward is provided in a bottom plate of the first accommodation chamber, the second accommodation chamber accommodates the fifth extension portion and the sixth extension portion, and a first through-hole is provided in a bottom portion of the second accommodation chamber,
wherein the rotary bracket includes a through-hole, and
wherein the screw is provided to penetrate the through-hole from below to above and then is threaded to inside of the fifth extension portion.

10. The rotatable cup holder of claim 9, wherein the rotary bracket further includes:
an annular insertion portion and an annular position limiting portion integrally formed with each other, a diameter of the annular insertion portion is smaller than a diameter of the annular position limiting portion, a second through-hole is provided in the annular insertion portion to accommodate a bottom portion of the fifth extension portion, and the through-hole is provided in the annular position limiting portion and corresponds to the second through-hole,
wherein the annular insertion portion is provided to penetrate the first through-hole and then is inserted into the accommodation groove, and
wherein the screw is provided to penetrate the through-hole from below to above and then is threaded to inside of the fifth extension portion to restrict the annular position limiting portion toward a lower side of the second accommodation chamber.

11. The rotatable cup holder of claim 10, further including a second position limiting elastic member,
wherein the second position limiting elastic member is mounted in the accommodation groove and surrounds the fifth extension portion, upper and lower end portions of the second position limiting elastic member respectively come into contact with a lower surface of the bottom plate of the cup holder main body and an upper surface of the annular position limiting portion of the rotary bracket to provide tension, and the tension brings cross-sections of the rotary bracket and the screw into contact with each other.

12. The rotatable cup holder of claim 11, wherein a seventh extension portion extending downward is further provided on the lower surface of the bottom plate of the cup holder main body, an arcuate position limiting groove is provided in the bottom plate of the first accommodation chamber, and the seventh extension portion is inserted into the arcuate position limiting groove and slidable along the arcuate position limiting groove.

13. The rotatable cup holder of claim 1, wherein a protruding portion or a concave groove is further provided on the first extension portion.

14. A vehicle provided with the rotatable cup holder of claim 1.

* * * * *